(12) United States Patent
Wurzel et al.

(10) Patent No.: US 8,958,028 B2
(45) Date of Patent: Feb. 17, 2015

(54) PROTECTIVE FILM PATTERNING

(75) Inventors: Joshua G. Wurzel, Sunnyvale, CA (US); Steven J. Martisauskas, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 587 days.

(21) Appl. No.: 13/163,570

(22) Filed: Jun. 17, 2011

(65) Prior Publication Data
US 2012/0320305 A1 Dec. 20, 2012

(51) Int. Cl.
*G02F 1/1335* (2006.01)
*F21V 8/00* (2006.01)

(52) U.S. Cl.
CPC ............ *G02B 6/0081* (2013.01); *G02B 6/0055* (2013.01); *G02B 6/0093* (2013.01)
USPC .......................................................... 349/61

(58) Field of Classification Search
None
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,270,466 B2 | 9/2007 | Lee et al. | |
| 7,663,607 B2 | 2/2010 | Hotelling et al. | |
| 7,905,650 B2 | 3/2011 | Ma et al. | |
| 8,339,373 B2 * | 12/2012 | Chang ........................... | 345/173 |
| 2005/0259194 A1 | 11/2005 | Lee et al. | |
| 2006/0026521 A1 | 2/2006 | Hotelling et al. | |
| 2006/0197753 A1 | 9/2006 | Hotelling | |
| 2010/0067257 A1 | 3/2010 | Meis et al. | |

FOREIGN PATENT DOCUMENTS

| | | |
|---|---|---|
| JP | 2000-163031 A | 6/2000 |
| JP | 2002-342033 A | 11/2002 |
| WO | WO-2006/031043 A1 | 3/2006 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

(Continued)

*Primary Examiner* — Sarah Hahm
(74) *Attorney, Agent, or Firm* — Kendall P. Woodruff

(57) ABSTRACT

The patterning of objects (e.g., protective poly-films, heat-spreaders, and other components placed proximate to the backlight of an LCD) with multiple beads or raised protrusions is disclosed. The beads or protrusions can have a uniform or non-uniform size and can be arranged such that they have a uniform or non-uniform pattern density. The beads or protrusions can be patterned on a surface of the object to provide separation between a non-raised surface of the object and a surface of an adjacent item, such as a reflector film.

15 Claims, 12 Drawing Sheets

(56) References Cited

OTHER PUBLICATIONS

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

PROTECTIVE FILM PATTERNING

FIELD

This relates generally to liquid crystal displays (LCDs), and, more specifically, to patterning objects to protect LCD reflector films.

BACKGROUND

Conventional LCDs operate by projecting light through a layer of liquid crystals and applying varying amounts of electrical charge to the liquid crystals in order to change the color and intensity of the display. Typically, a backlight is used as a source for the light projected through the liquid crystal layer. The backlight generally includes a light source coupled to a light-guide that is oriented toward the layer of liquid crystals.

To increase the amount of light directed to the layer of liquid crystals, some backlights include a thin-film reflector attached to the back of the light-guide to reflect stray light toward the liquid crystal layer. While the reflector film improves the quality of the display, the reflector film is very thin and susceptible to damage. For example, the reflector film may occasionally "wet out" against materials placed against or near the reflector film (e.g., a protective poly-film applied to the reflector film or heat-spreader behind the LCD). Here, "wet out" refers to the condition that occurs when the reflector film permanently conforms to the shape of the object that it contacts.

Since the backlight supplies the light for an LCD, the quality of the display depends in part on the quality of light produced by the backlight assembly. As a result, damage caused to portions of the backlight assembly, such as the reflector film, may cause a reduction in performance of the LCD. Thus, it is desirable to protect the components of the LCD.

SUMMARY

This relates to patterning objects (e.g., protective poly-films, heat-spreaders, and other components placed proximate to the backlight of an LCD) with multiple beads or raised protrusions. The beads or protrusions can have a uniform or non-uniform size and can be arranged such that they have a uniform or non-uniform pattern density. The beads or protrusions can be patterned on a surface of the object to provide separation between a non-raised surface of the object and a surface of an adjacent item, such as a reflector film. This can advantageously prevent or reduce damage to the adjacent item caused by the patterned object.

DETAILED DESCRIPTION

In the following description of example embodiments, reference is made to the accompanying drawings in which it is shown by way of illustration specific embodiments that can be practiced. It is to be understood that other embodiments can be used and structural changes can be made without departing from the scope of the various embodiments.

This relates to patterning objects (e.g., protective poly-films, heat-spreaders, and other components placed proximate to the backlight of an LCD) with multiple beads or raised protrusions. The beads or protrusions can have a uniform or non-uniform size and can be arranged such that they have a uniform or non-uniform pattern density. The beads or protrusions can be patterned on a surface of the object to provide separation between a non-raised surface of the object and a surface of an adjacent item, such as a reflector film. This can advantageously prevent or reduce damage to the adjacent item caused by the patterned object.

In some embodiments, the beads or protrusions can be patterned on a surface of a protective poly-film covering a reflector film to prevent the reflector film from experiencing wet out. In some embodiments, the beads or protrusions can be patterned on a surface of an LCD component adjacent to the reflector film, e.g., a heat-spreader, battery, printed circuit board, processor chip, or the like, to prevent the reflector film from experiencing wet out. These will be described in more detail below.

Figure 1:
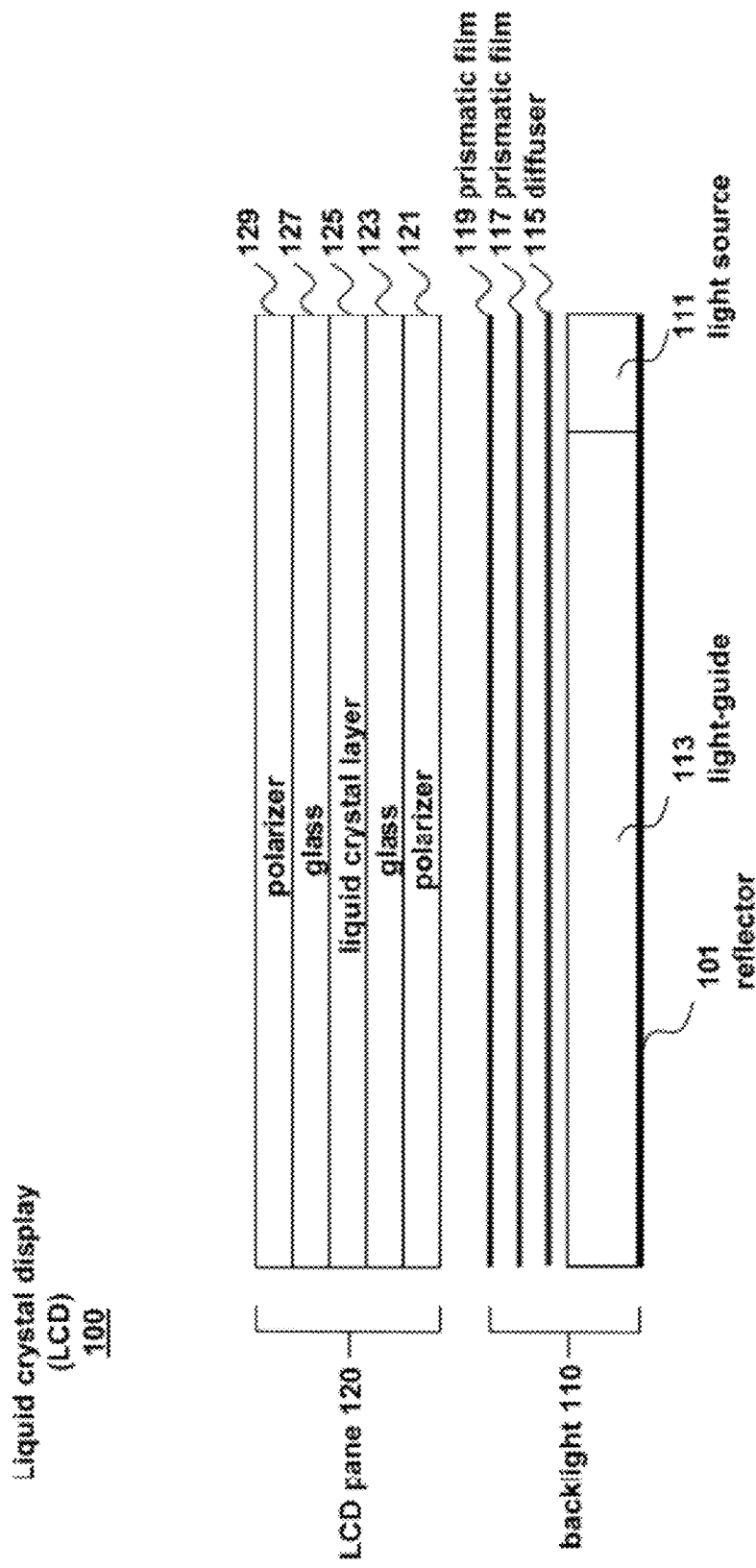
FIG. 1 illustrates a cross-sectional view of an exemplary LCD according to various embodiments.

FIG. 1 illustrates a cross-sectional view of a block diagram of an exemplary liquid crystal display (LCD) 100. In the example shown in FIG. 1, LCD 100 can generally include backlight 110 and LCD pane 120.

Since liquid crystals do not emit light on their own, backlight 110 can be used to project light through the LCD crystals contained in LCD pane 120. Backlight 110 can include light source 111 built into the sides or back of the device for providing the light projected up to LCD pane 120. Backlight 110 can further include light-guide 113 for directing the light from light source 111 toward LCD pane 120. In some embodiments, backlight 110 can further include diffuser 115 to disperse the light from light-guide 113 to generate a more uniform light intensity over the display surface of LCD 100. Backlight 110 can further include one or more prismatic films 117 and 119 for refracting the light from diffuser 115 to collimate the light to the viewer of LCD 100.

To improve light collection, a reflector 101 can be attached to the bottom of backlight 110. Specifically, reflector 101 can be attached to the bottom of light source 111 and light-guide 113 to reflect light emitted away from LCD pane 120 back through light-guide 113 to LCD pane 120. Reflector 101 can include any thin-film reflector used in LCD devices.

LCD 100 can further include LCD pane 120 for controlling the transmittance of light from backlight 110 to the front of the display. LCD pane 120 can include a pair of polarizers 121 and 129, which can be separated by a layer of liquid crystals 125 contained in a cell gap between glass plates 123 and 127. Polarizer 121 can filter the light from backlight 110 by allowing only the portions of the light vibrating in the plane of the optical axis of the polarizer to pass through.

While specific embodiments of LCD 100 have been described above, it should be appreciated that other devices may likewise be used, including but not limited to, multi-domain vertical alignment, patterned vertical alignment, in-plane switching, and super-twisted nematic type LCDs.

Figure 2:
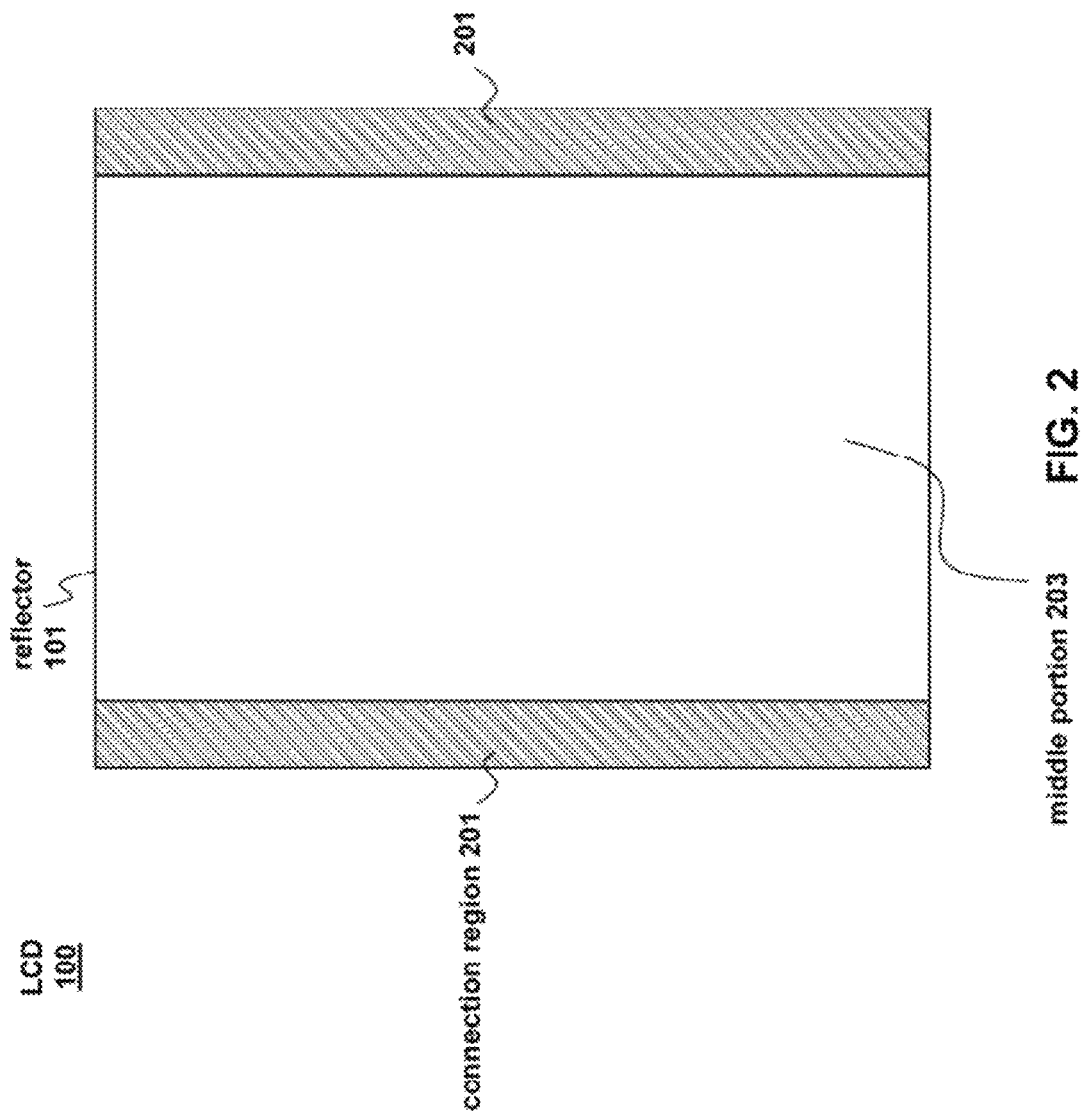
FIG. 2 illustrates an exemplary connection between a reflector film and a backlight assembly according to various embodiments.

FIG. 2 illustrates a bottom-view of LCD 100 showing the connection regions between reflector 101 and an underlying backlight (such as backlight 110 of FIG. 1) according to various embodiments. Specifically, the shaded regions 201 represent areas where an adhesive can be used to connect reflector 101 to the bottom of the backlight. The adhesive can be applied to the outer portions of the reflector 101 or the backlight to avoid placing adhesive, which can prevent light from being reflected back up to an adjacent LCD pane (such as LCD pane 120 of FIG. 1), in the areas corresponding to the active area of LCD 100. Thus, in these embodiments, the middle portion 203 of reflector 101 may not be connected to the backlight. This may, in some situations, lead to separation between reflector 101 and the backlight. For example, as illustrated in FIG. 3, the middle portion 203 of reflector 101 may sag due to thermal expansion of the reflector or slack in the reflector caused by manufacturing tolerances.

Figure 3:
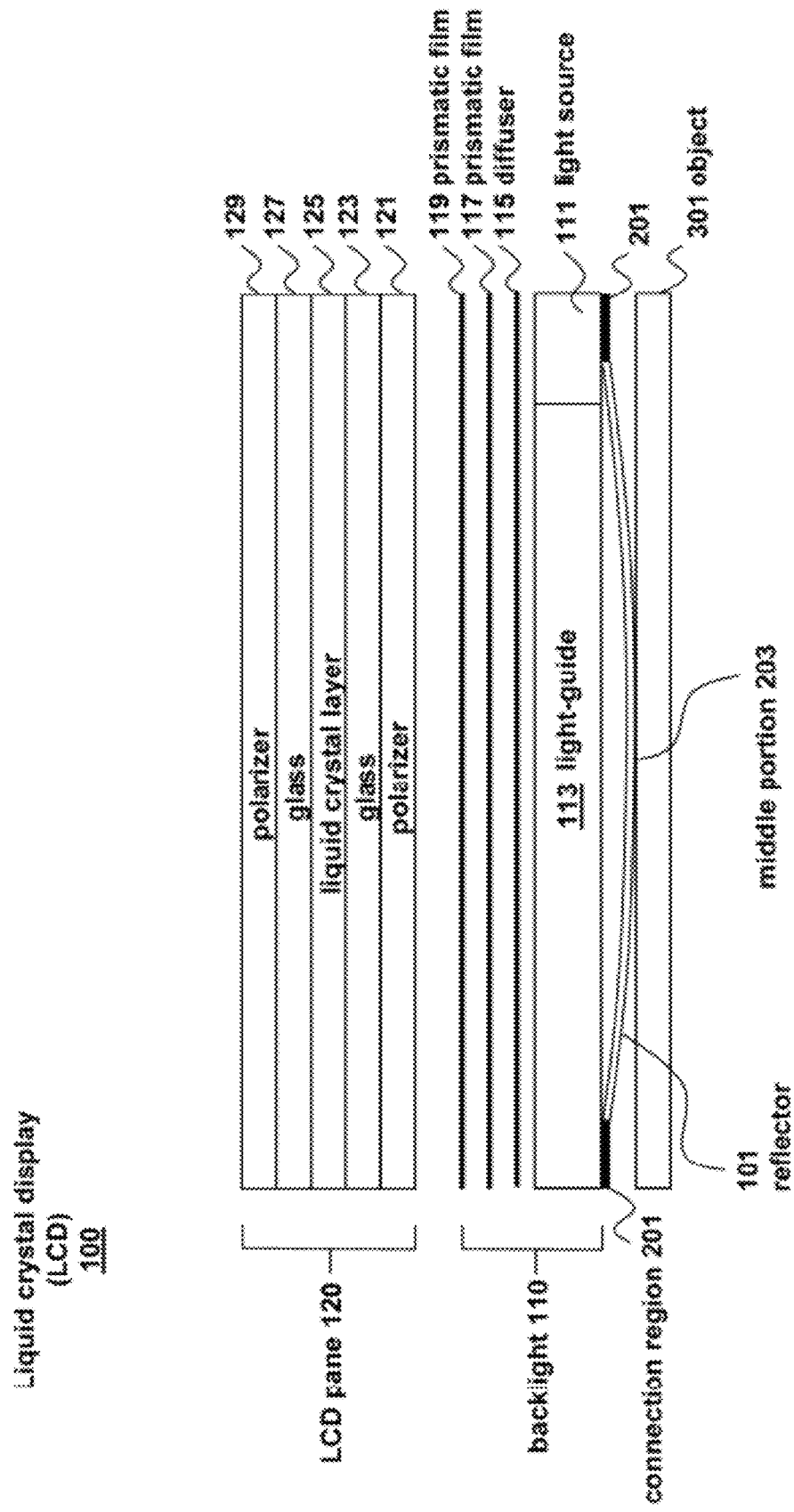
FIG. 3 illustrates a cross-sectional view of an exemplary LCD with a protective poly-film according to various embodiments.

As shown in FIG. 3, the sag in reflector 101 can cause at least a portion of the reflector 101 (e.g., middle portion 203) to contact an object 301 located behind or below the reflector. Object 301 can include, for example, a protective poly-film that is applied to reflector 101 during storage or transportation of backlight 110. Alternatively, in other examples, object 301 can include a support frame or plate, heat-spreader, battery, printed circuit board, processor chip, or the like, located behind backlight 110 in a device incorporating LCD 100. If reflector 101 remains in contact with object 301 for a sufficiently long period of time, reflector 101 may "wet out" against object 301. In other words, reflector 101 may permanently conform to the shape of object 301. This can result in a reduction in performance of backlight 110, and, consequently, LCD 100.

To prevent the reflector from experiencing wet out, a patterned protective poly-film according to various embodiments can be used to cover the reflector, thereby providing separation from components adjacent thereto.

Figure 4:
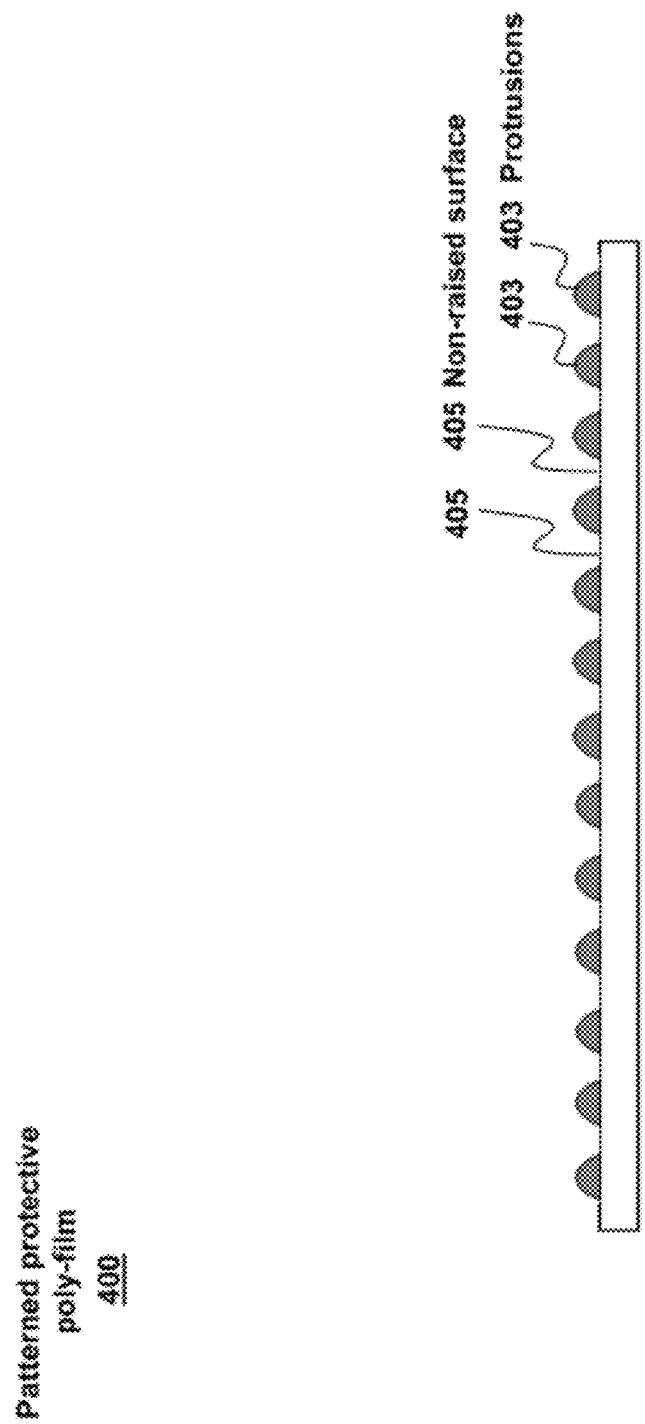
FIG. 4 illustrates a cross-sectional view of an exemplary patterned protective poly-film according to various embodiments.
Figure 5:
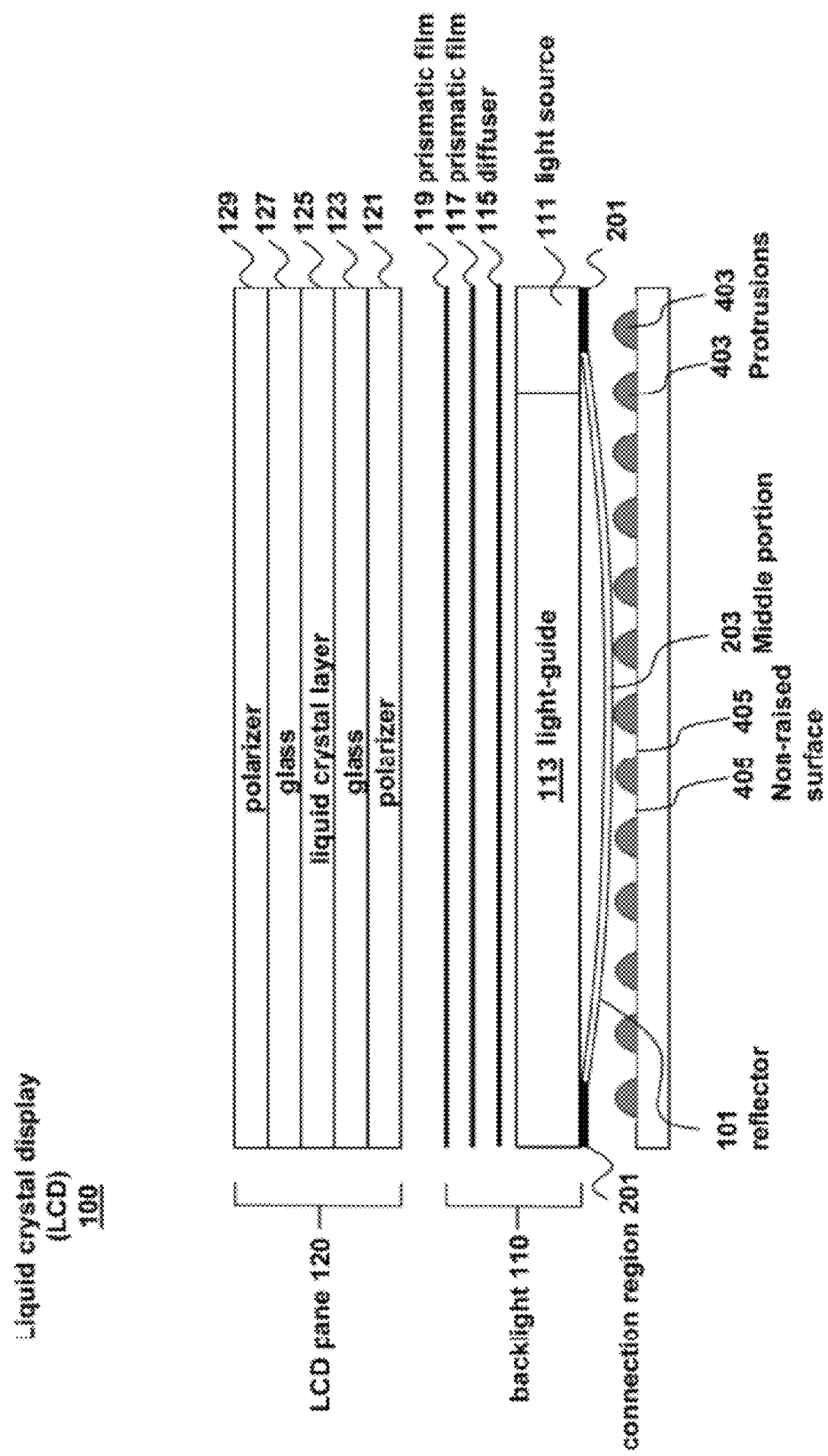
FIG. 5 illustrates a cross-sectional view of an exemplary LCD with an exemplary patterned protective poly-film according to various embodiments.

FIG. 4 illustrates a cross-sectional view of patterned protective poly-film 400 that can be used, for example, to cover reflector 101 during storage or transport of backlight 110 or can be used to permanently cover reflector 101. Patterned protective poly-film 400 can include beads or raised protrusions 403 distributed on a surface of the film. Protrusions 403 can be included to separate the non-raised surface 405 of protective poly-film 403 from another surface, such as a surface of reflector 101. For instance, as shown in FIG. 5, the tops of protrusions 403 can contact reflector 101 and separate the non-raised surface 405 of patterned protective poly-film 400 from reflector 101. Since only the top portions of protrusions 403 contact reflector 101, only small, discrete regions of reflector 101 can contact patterned protective poly-film 400. This can eliminate, or at least reduce, the wet out effect experienced by reflector 101 when used with protective poly-films.

The size of the beads or raised protrusions 403 can be varied based on the specific application. For example, in some embodiments, protrusions 403 can have a width and height between 5 and 15 µm. However, it should be appreciated that protrusions of any size can be used depending on the thickness and material used to form reflector 101 and the thickness and material used to form patterned protective poly-film 400. For instance, protrusions 403 having a larger height can be used for a reflector 101 formed of a thinner or softer material. This can be done to prevent reflector 101 from contacting the non-raised surface 405 of patterned protective poly-film 400 that would otherwise occur due to the increased amount of sag experienced by a thinner or softer reflector 101 between protrusions 403. Alternatively, or in addition, protrusions 403 having a larger width can be used for reflectors 101 formed of a thinner or softer material to provide additional support for reflector 101. This can reduce the amount of deformation experienced by a thinner or softer reflector 101. Conversely, protrusions 403 having a smaller height, smaller width, or both, can be used for reflectors 101 formed of a thicker or stiffer material because less sag may occur in these reflectors 101 between protrusions 403 and less support may be needed for the reflector.

In some embodiments, the height and width of protrusions 403 can also be varied in a similar manner based on the thickness and material used for protective poly-film 400. For instance, since the non-raised surface 405 of patterned protective poly-film 400 can sag towards reflector 101 in manner similar to the way that reflector 101 sags towards patterned protective poly-film 400, protrusions 403 having a larger height, larger width, or both, can be used for a patterned protective film 400 formed of a thinner or softer material. Conversely, protrusions 403 having a smaller height, smaller width, or both, can be used for patterned protective poly-film 400 formed of a thicker or stiffer material because less sag may occur in these patterned protective poly-films 400 between protrusions 403 and less support may be needed.

The distributions of protrusions 403 can also be varied based on the specific application. In some embodiments, protrusions can be uniformly, or at least substantially uniformly distributed on a surface of patterned protective poly-film. For example, distances between adjacent protrusions can be within 5% of each other due to manufacturing tolerances.

Figure 6:
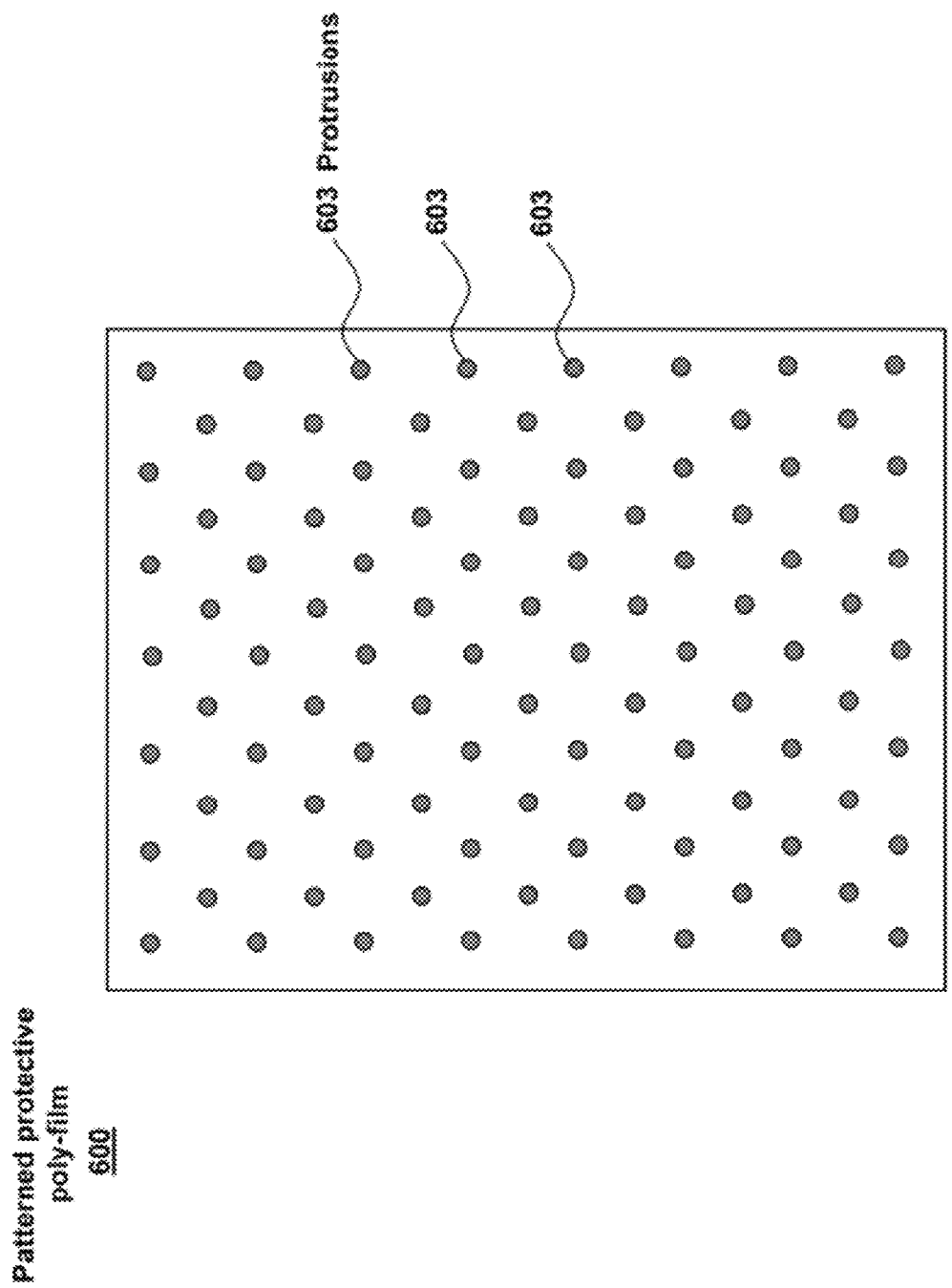
FIG. 6 illustrates a top-view of an exemplary patterned protective poly-film according to various embodiments.

FIG. 6 illustrates a top-view of patterned protective poly-film 600 having multiple protrusions 603 uniformly distributed across its surface. The average density of protrusions 603 can vary depending on the thickness of reflector 101, the material used to form reflector 101, the thickness of patterned protective poly-film 600, the material used to form patterned protective poly-film 600, and the size of protrusions 603. For instance, higher densities of protrusions 603 can be used for a reflector 101 formed of a thinner or softer material. This can be done to compensate for the increased amount of sag that may occur in reflector 101 between protrusions 603. Additionally, higher densities of protrusions 603 can be used with smaller protrusions 603 to prevent reflector 101 from contacting the non-raised surface of the patterned protective poly-film due to the reduced distance between the top of protrusions 603 and the non-raised surface of the patterned protective poly-film. Conversely, lower densities of protrusions 603 can be used for a reflector 101 formed of a thicker or stiffer material because less sag may occur in the reflector 101 between protrusions 603. Additionally, lower densities of protrusions 603 can be used with larger protrusions to prevent reflector 101 from contacting the flat portion of patterned protective poly-film 600 due to the increased distance between the top of protrusions 603 and the non-raised surface of the patterned protective poly-film.

In some embodiments, the distributions of protrusions 603 can also be varied in a similar manner based on the thickness and material used for protective poly-film 600. For instance, since the non-raised surface of patterned protective poly-film 600 can sag towards reflector 101 in manner similar to the way that reflector 101 sags towards patterned protective poly-film 600, higher densities of protrusions 603 can be used for a patterned protective film 600 formed of a thinner or softer material. Conversely, lower densities of protrusions 603 can be used for patterned protective poly-film 600 formed of a thicker or stiffer material because less sag may occur in these patterned protective poly-films 600 between protrusions 603 and less support may be needed.

Figure 7:
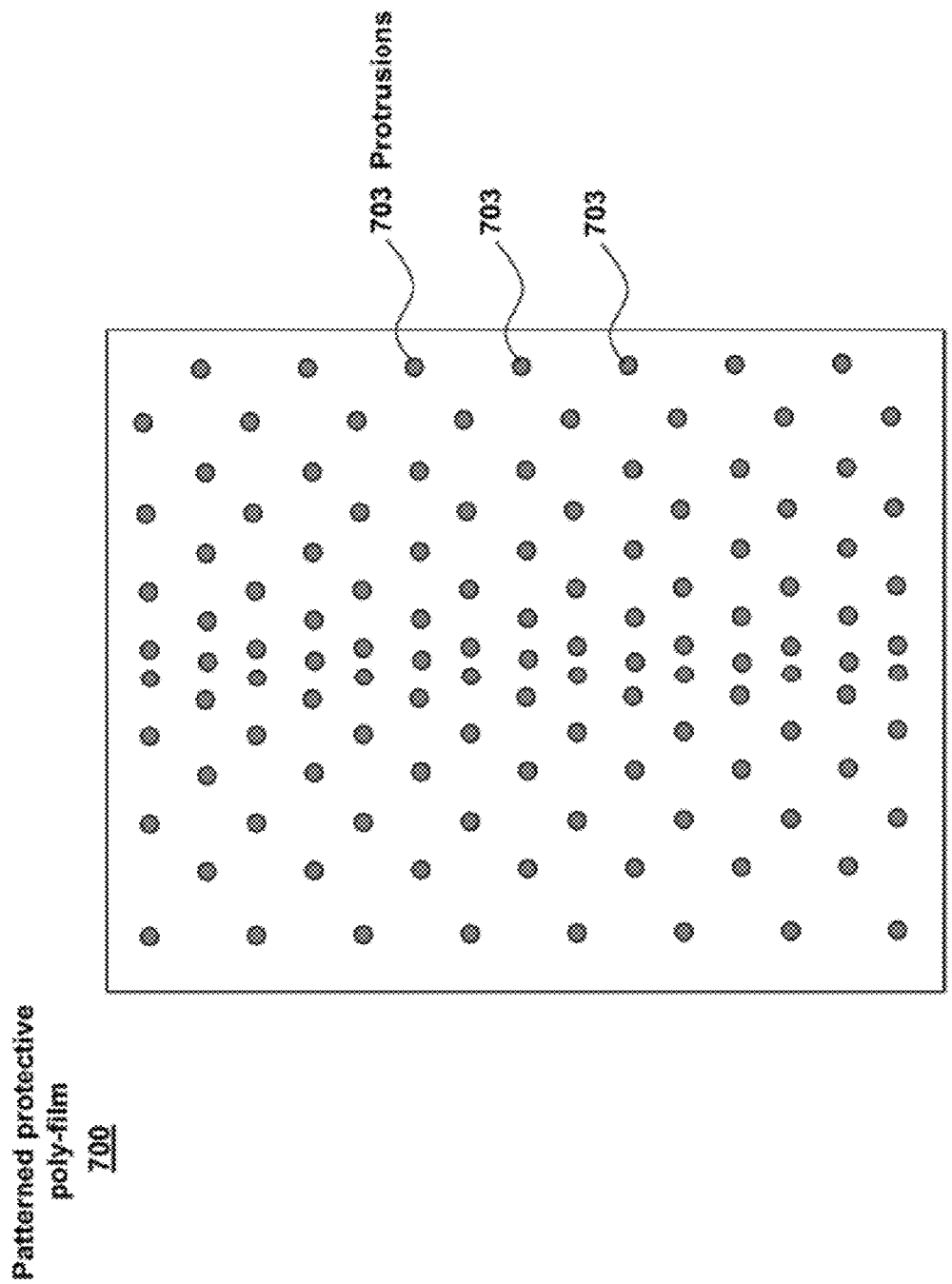
FIG. 7 illustrates a top-view of another exemplary patterned protective poly-film according to various embodiments.

In other embodiments, protrusions can be non-uniformly distributed on a surface of a patterned protective poly-film. For example, FIG. 7 illustrates a top-view of patterned protective poly-film 700 having multiple protrusions 703 that are non-uniformly distributed across its surface. In some embodiments, patterned protective poly-film 700 can attach to a reflector that is connected to a backlight in a manner similar to that shown in FIG. 2. Thus, in these embodiments, patterned protective poly-film 700 can have a higher density of protrusions 703 near the center of the film to compensate for the increased amount of sag expected in that area. Patterned protective poly-film 700 can have a lower density of protrusions 703 near the sides of the film since this is the region that the reflector is attached to the backlight, and, as such, less sag is expected in these areas.

While specific examples are provided above, protrusions 703 can be distributed in other patterns based on the connection regions between the protective film and reflector. For example, if the reflector is also connected to the backlight at the top and bottom of the film, the protrusion density near those locations can also be lower. Generally, in some embodiments, the density of protrusions can increase as the distance between the protrusion and the connection region increases.

In other embodiments, both the density and size of protrusions can be varied on the surface of the protective poly-film. For example, the density of the protrusions can be higher and the size of the protrusions can be larger in areas that are farther away from the connection regions between the reflector and backlight. Similarly, the density of the protrusions can be lower and the size of the protrusions can be smaller in areas that are closer to the connection regions between the reflector and backlight. Thus, in some embodiments, the density of the protrusions can become increasingly higher and the size of the protrusions can become increasingly larger as the distance between the protrusion and the connection region increases.

It should be appreciated that the determination of an appropriate size and pattern of beads or protrusions for a given application can be an iterative process. Using the factors described above, one of ordinary skill in the art would understand how to vary the size and pattern of protrusions to determine an effective pattern to be used on a surface for any given application. Additionally, while example patterns of protrusions have been provided above, it should be appreciated that other designs, such as circles, horizontal lines, vertical lines, diagonal lines, and the like, may be used.

Figure 8:
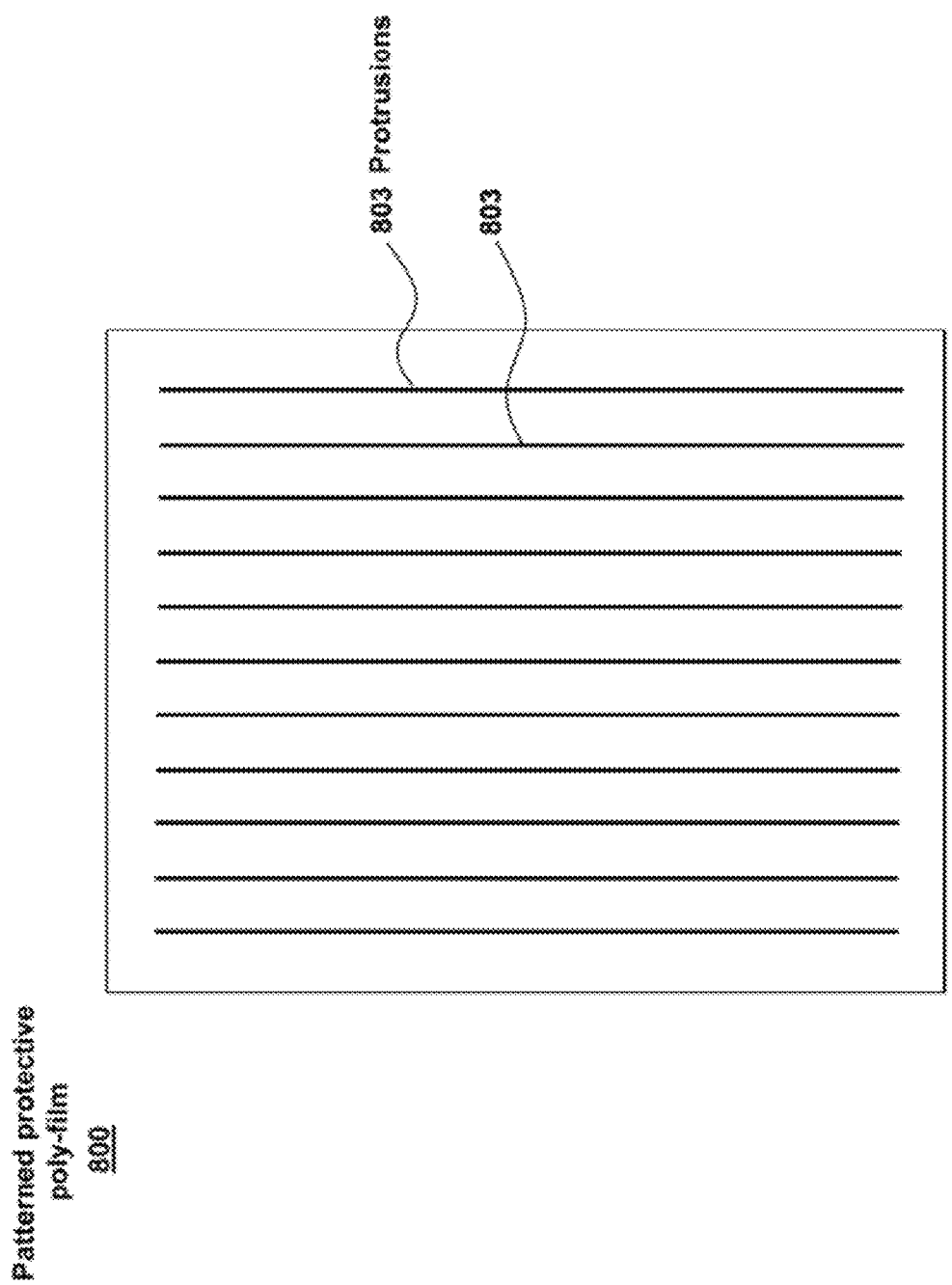
FIG. 8 illustrates a top-view of another exemplary patterned protective poly-film according to various embodiments.
Figure 9:
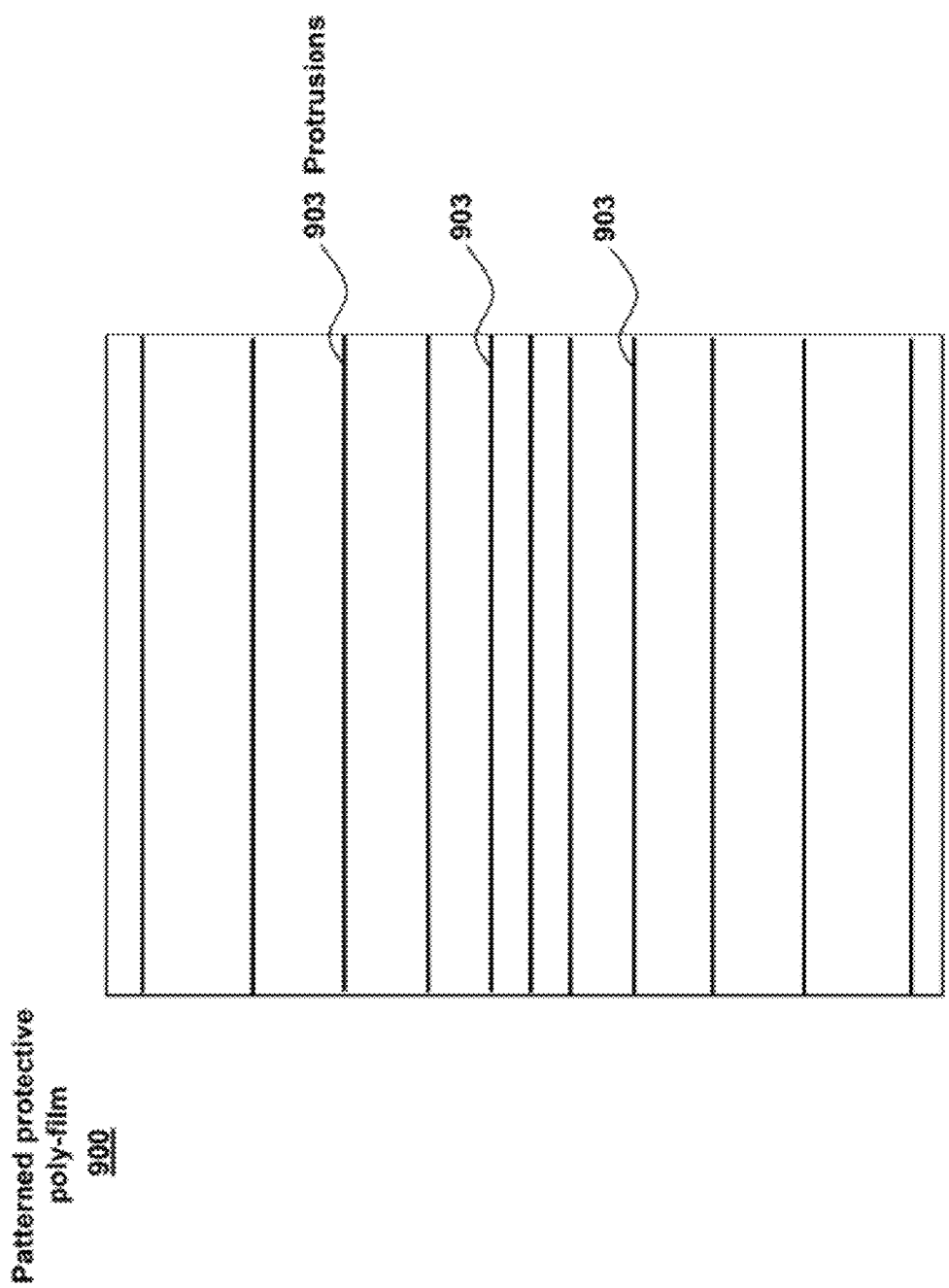
FIG. 9 illustrates a top-view of another exemplary patterned protective poly-film according to various embodiments.
Figure 10:
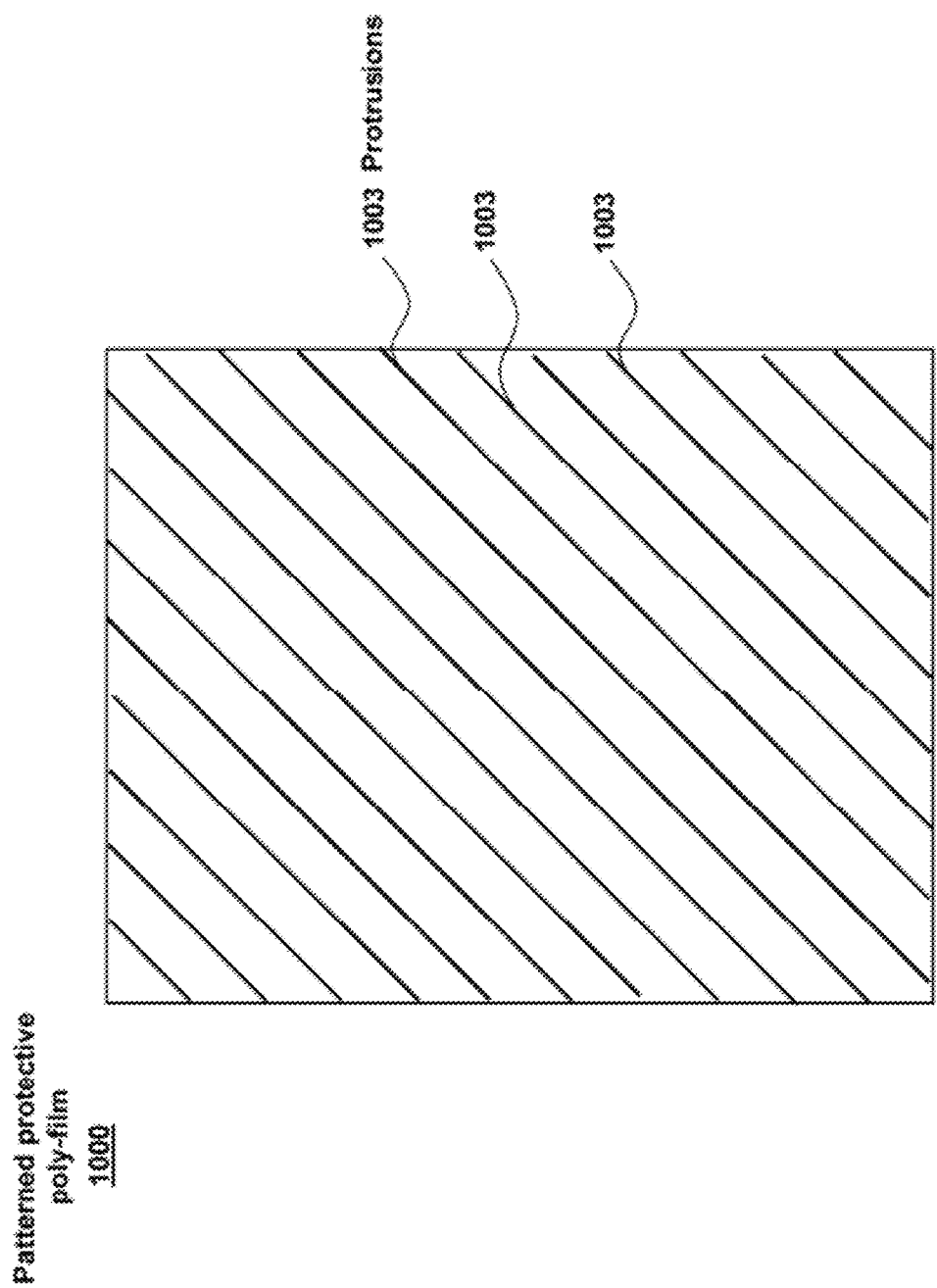
FIG. 10 illustrates a top-view of another exemplary patterned protective poly-film according to various embodiments.
Figure 11:
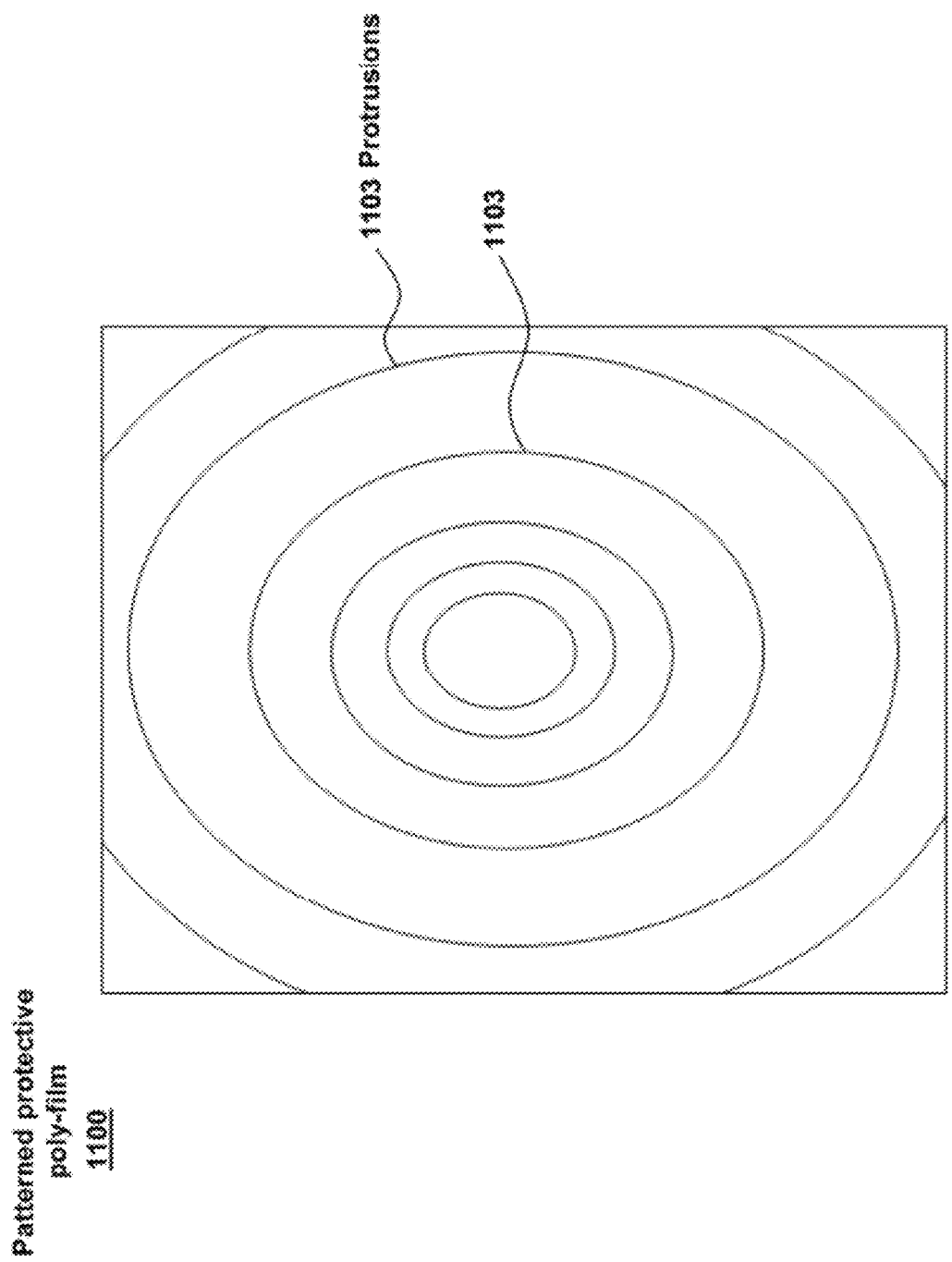
FIG. 11 illustrates a top-view of another exemplary patterned protective poly-film according to various embodiments.

For example, in some embodiments, the protrusions used for the patterned protective film can include ridges arranged in various patterns. FIG. 8 illustrates a top-view of patterned protective poly-film 800 having multiple protrusions 803. The protrusions 803 can include multiple raised ridges arranged in a uniform vertical pattern. Similarly, FIG. 9 illustrates a top-view of patterned protective poly-film 900 having multiple protrusions 903. The protrusions 903 can include multiple raised ridges arranged in a non-uniform horizontal pattern. FIG. 10 illustrates a top-view of patterned protective poly-film 1000 having multiple protrusions 1003. The protrusions 1003 can include multiple raised ridges arranged in a uniform diagonal pattern. FIG. 11 illustrates a top-view of patterned protective poly-film 1100 having multiple protrusions 1103. The protrusions 1103 can include multiple raised ridges arranged in concentric non-uniform ovals.

Figure 12:
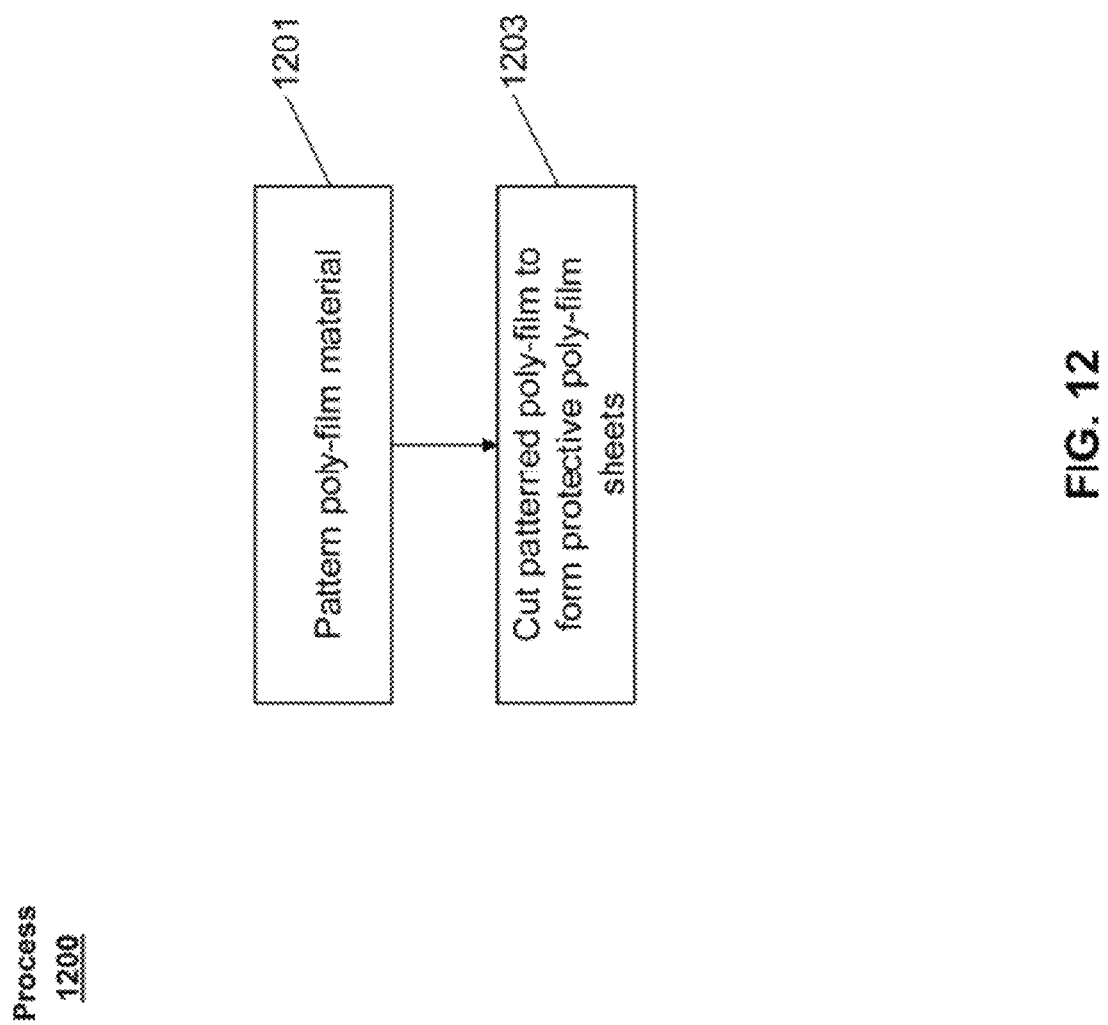
FIG. 12 illustrates an exemplary process for patterning a protective poly-film according to various embodiments.

In some embodiments, the protrusions can be formed of the same material as the patterned protective poly-film. In these embodiments, the patterned protective poly-film can be formed by exemplary process 1200 in FIG. 12. At block 1201 of process 1200, poly-film material (e.g., a roll of poly-film) can be patterned to have multiple protrusions, such as protrusions 403. The poly-film material can be patterned by rolling a roller having a patterned surface across the poly-film or by stamping the poly-film with a press or plate having a patterned surface. In some examples, the surfaces of the roller or stamp can include protrusions configured to produce corresponding protrusions in the poly-film when pressed against the poly-film. In other examples, the surfaces of the roller or stamp can include dimples configured to produce corresponding protrusions in the poly-film when pressed against the poly-film surface. In this manner, the poly-film material can be rolled or stamped to have protrusions having a desired size, shape, and density. As a result, protrusions made of the same material as the poly-film can be formed on the surface of the poly-film material. At block 1203, the patterned poly-film can be cut using, for example, a die cutter, to form protective poly-film sheets having a desired shape and size. The resulting patterned protective poly-film can then be applied to a reflector as described above. In other embodiments, the actions performed at blocks 1201 and 1203 can be reversed. Specifically, the poly-film can be cut into sheets having a desired shape and size and may then be patterned to generate the desired pattern of protrusions. Alternatively, pre-cut protective poly-film sheets may be patterned to generate the desired pattern of protrusions.

While the patterning process has been described above with respect to protective poly-films, it should be appreciated that the patterning technology can be applied to other objects. For example, objects within a device housing an LCD can be patterned to prevent wet out of the backlight reflector. Specifically, the panel behind the LCD and adjacent to the reflector can be patterned to provide separation between surfaces of the object and the reflector. Since these panels can be formed of various materials, such as metal, plastic, graphite, and the like, other patterning processes can be used. For example, depending on the material to be patterned, stamping, laser patterning, or other known processes for manipulating the surface of the material can be used to form the multiple protrusions having sizes and pattern distributions as described above for the patterned protective poly-film. In some embodiments, instead of patterning the object behind the LCD, a patterned protective poly-film, such as patterned protective poly-film 400, can be applied to the object.

In these embodiments, the dimensions and distribution of protrusions on the object or patterned protective film applied to the object can further depend on the clearance desired between the reflector and the object, the material used to form the object, and the shape or design of the object. For example, larger protrusions can be used when a larger clearance is required between the reflector and the object, while smaller protrusions can be used when a smaller clearance is required. Additionally, the size and distribution pattern of protrusions can vary based on the material, shape, and design of the object in a manner similar to that described above based on the material and thickness of reflector 400.

Although embodiments have been fully described with reference to the accompanying drawings, it is to be noted that various changes and modifications will become apparent to those skilled in the art. Such changes and modifications are to be understood as being included within the scope of the various embodiments as defined by the appended claims.

What is claimed is:

1. A liquid crystal display comprising:
a backlight assembly;
a reflector positioned against the backlight assembly; and
a protective film covering at least a portion of a surface of the reflector opposite the backlight assembly, wherein the protective film comprises a plurality of raised protrusions formed on a surface of the protective film contacting the reflector, wherein the raised protrusions comprise the same material as the protective film, and wherein the plurality of raised protrusions are operable to separate the reflector from a non-raised portion of the surface of the protective film.

2. The display of claim 1, wherein the reflector is coupled to the backlight assembly at one or more connection regions.

3. The display of claim 2, wherein a density of the plurality of raised protrusions is greater in a first region of the surface of the protective film than in a second region of the surface of the protective film, and wherein a distance between the one or more connection regions and the first region is greater than a distance between the one or more connection regions and the second region.

4. The display of claim 2, wherein a size of a first subset of the plurality of raised protrusions is larger than a size of a second subset of the plurality of raised protrusions, and wherein a distance between the one or more connection regions and the first subset of the plurality of raised protrusions is greater than a distance between the one or more connection regions and the second subset of the plurality of raised protrusions.

5. The display of claim 1, wherein a size of each raised protrusion in a first subset of the plurality of raised protrusions is larger than a size of each raised protrusion in a second subset of the plurality of raised protrusions.

6. The display of claim 1, wherein each raised protrusion in the plurality of raised protrusions has a height between 5-15 µm.

7. The display of claim 1, wherein the plurality of raised protrusions are uniformly distributed on the surface.

8. A display device, the device comprising:
a liquid crystal display comprising:
a backlight assembly, and
a reflector positioned against the backlight assembly; and
a panel positioned adjacent a surface of the reflector opposite the backlight assembly, wherein the panel comprises a plurality of raised protrusions formed on a surface of the panel adjacent the reflector, wherein the plurality of raised protrusions are operable to separate the reflector from a non-raised portion of the surface of the panel, wherein the plurality of raised protrusions are non-uniformly distributed on the surface of the panel, and wherein a top surface of at least one of the raised protrusions is in contact with the reflector.

9. The display device of claim 8, wherein the panel comprises a portion of at least one of a heat-spreader, support frame, battery, printed circuit board, or processor.

10. The display device of claim 8, wherein a size of each protrusion of a first subset of the plurality of protrusions is larger than a size of each protrusion of a second subset of the plurality of protrusions.

11. A method of manufacturing a panel of a display device, the method comprising:
forming a plurality of raised protrusions on a first surface of the panel, wherein the plurality of raised protrusions are operable to separate a surface of an at least semi-rigid material in contact with the plurality of raised protrusions from a non-raised surface of the first surface and wherein forming the plurality of raised protrusions on the first surface of the panel comprises applying a patterned protective film to the first surface of the panel.

12. The method of claim 11, wherein the semi-rigid material comprises a reflector.

13. The method of claim 11, wherein the panel comprises a portion of at least one of a heat-spreader, support frame, battery, printed circuit board, or processor.

14. A method of manufacturing a panel of a display device, the method comprising:
forming a plurality of raised protrusions on a first surface of the panel, wherein the plurality of raised protrusions are operable to separate a surface of an at least semi-rigid material in contact with the plurality of raised protrusions from a non-raised surface of the first surface, wherein the panel comprises metal and wherein forming the plurality of raised protrusions on the first surface of the panel comprises stamping the metal to form the plurality of raised protrusions.

15. A liquid crystal display comprising:
a backlight assembly;
a reflector positioned against the backlight assembly; and
a protective film covering at least a portion of a surface of the reflector opposite the backlight assembly, wherein the protective film comprises a plurality of raised protrusions formed on a surface of the protective film contacting the reflector, wherein the plurality of raised protrusions are operable to separate the reflector from a non-raised portion of the surface of the protective film, and wherein the plurality of raised protrusions are non-uniformly distributed on the surface.

* * * * *